(12) United States Patent
Hagino (10) Patent No.: US 7,619,400 B2
(45) Date of Patent: Nov. 17, 2009

(54) COMPACT VOLTAGE STEP-UP/STEP-DOWN SWITCHING REGULATOR

(75) Inventor: Koichi Hagino, Kawanishi (JP)

(73) Assignee: Ricoh Company, Ltd., Tokyo (JP)

( * ) Notice: Subject to any disclaimer, the term of this patent is extended or adjusted under 35 U.S.C. 154(b) by 258 days.

(21) Appl. No.: 11/605,007

(22) Filed: Nov. 28, 2006

(65) Prior Publication Data

US 2007/0120546 A1      May 31, 2007

(30) Foreign Application Priority Data

Nov. 29, 2005    (JP) .............................. 2005-344177

(51) Int. Cl.
    *G05F 1/618*    (2006.01)
(52) U.S. Cl. ........................ 323/287; 323/266; 323/224
(58) Field of Classification Search ......... 323/282–288, 323/271–275, 268, 224, 277
    See application file for complete search history.

(56) References Cited

U.S. PATENT DOCUMENTS 5,481,178 A * 1/1996 Wilcox et al. ............... 323/287
7,199,563 B2 * 4/2007 Ikezawa ..................... 323/266

FOREIGN PATENT DOCUMENTS

JP          3440314       6/2003
JP       2004-328964     11/2004

* cited by examiner

*Primary Examiner*—Rajnikant B Patel
(74) *Attorney, Agent, or Firm*—Cooper & Dunham, LLP (57) ABSTRACT

This patent specification describes a switching regulator which includes a step-up/step-down unit configured to generate an output voltage by stepping up or down an input voltage in accordance with a control signal, and a control unit configured to cause the step-up/step-down unit to perform the step-up or step-down operation.

12 Claims, 5 Drawing Sheets

COMPACT VOLTAGE STEP-UP/STEP-DOWN SWITCHING REGULATOR

TECHNICAL FIELD

The present disclosure relates to a compact voltage step-up/step-down switching regulator, and more particularly to a compact voltage step-up/step-down switching regulator capable of supplying regulated voltage.

BACKGROUND

Recently, portable equipment which uses a battery, such as a mobile phone, a digital camera and so on, has been widely developed. Such portable equipment commonly uses a constant voltage circuit which supplies a constant power supply voltage. The constant voltage circuit widely employs a voltage step-up/step-down switching regulator to obtain a regulated voltage.

A conventional voltage step-up/step-down switching regulator employs two DC-DC converters, i.e., a step-up converter and a step-down DC-DC converter. The conventional voltage step-up/step-down switching regulator performs a step-down operation by activating the step-down DC-DC converter when an input voltage is larger than an output voltage so as to output a predetermined constant voltage. Meanwhile, the conventional voltage step-up/step-down switching regulator performs a step-up operation by activating the step-up DC-DC converter when the input voltage is smaller than the output voltage.

Figure 1:
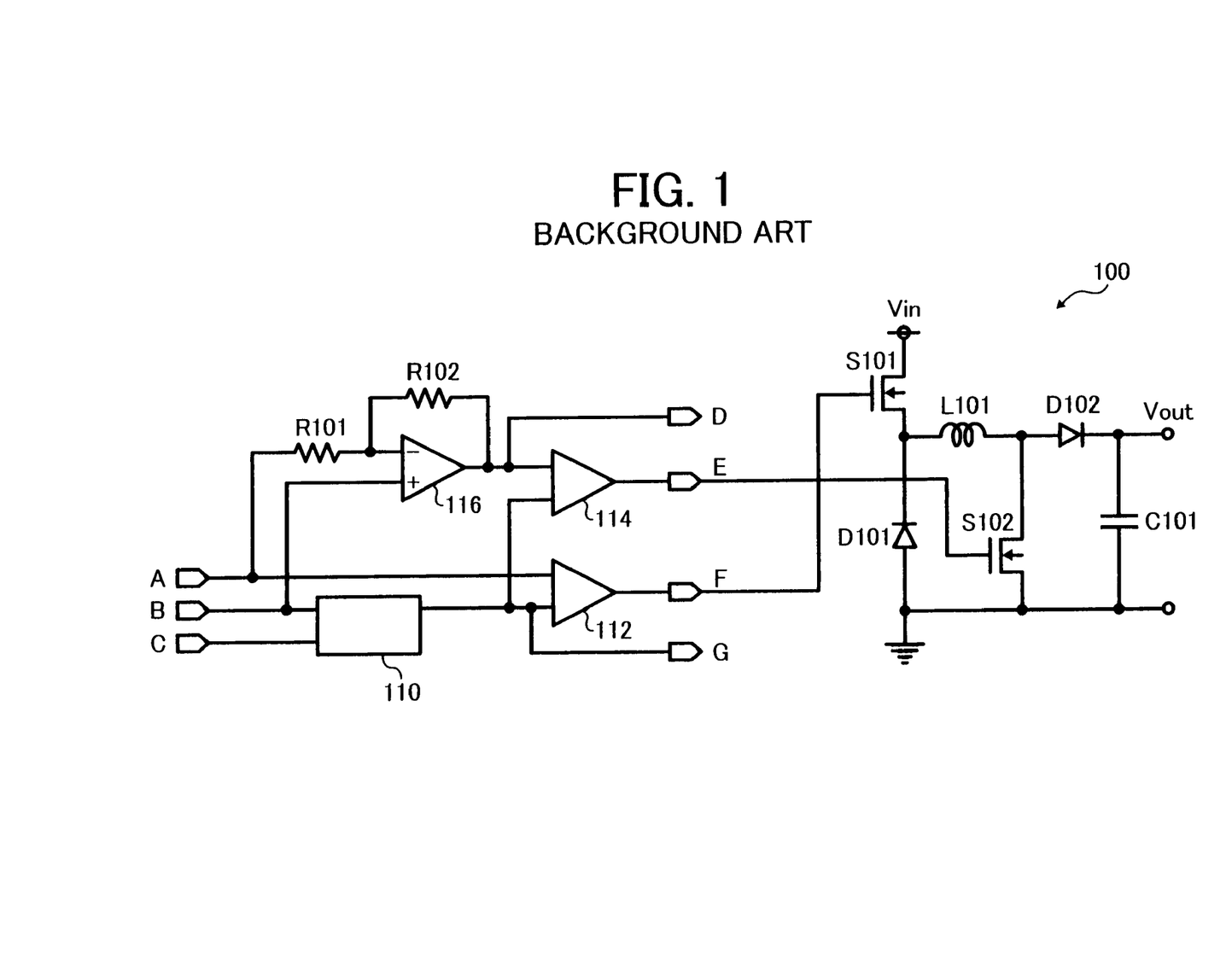
FIG. 1 illustrates a conventional voltage step-up/step-down switching regulator.
Figure 2:
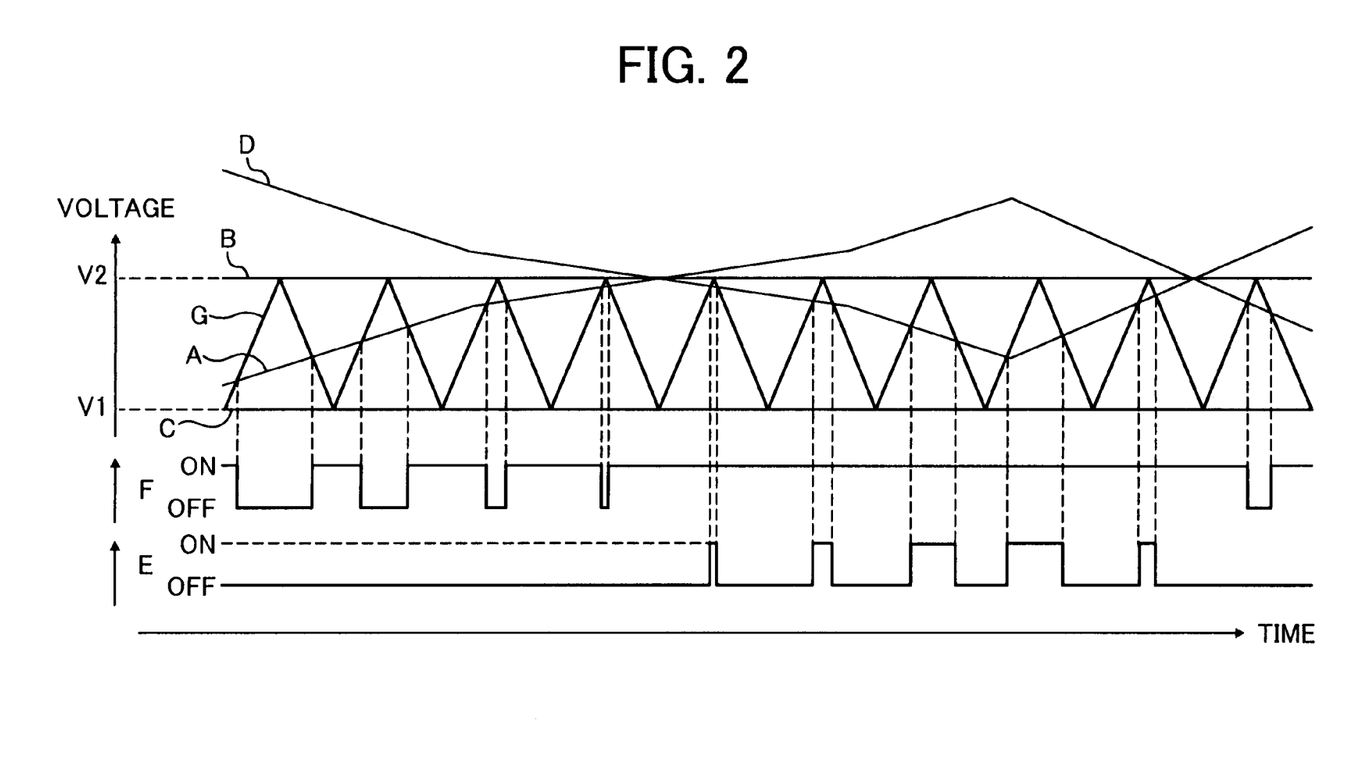
FIG. 2 illustrates a timing chart of waveforms of each part of the circuit of FIG. 1.

FIG. 1 illustrates a conventional voltage step-up/step-down switching regulator 100. FIG. 2 illustrates a timing chart of waveforms of each part of the circuit of FIG. 1.

The voltage step-up/step-down switching regulator 100 includes an oscillator 110, an operational amplifier 116, PWM (pulse width modulation) comparators 112 and 114, and resistors R101 and R102.

A signal A is an output signal from an error amplifier (not shown) and is an amplified signal of a difference voltage between a reference voltage and a proportional-voltage proportional to the output voltage. The signal A is defined as an error signal A. A signal B is an upper peak voltage V2 and a signal C is a low voltage V1 which is lower than the upper peak voltage V2.

The oscillator 110 generates a triangular wave G which swings between the upper peak voltage V2 as an upper limit voltage and the lower peak voltage V1 as a lower limit voltage.

The operational amplifier 116 forms an inverting amplifier to have a reference voltage with the upper limit voltage V2 of the triangular wave. If the resistors R101 and R102 have equal resistance value from each other, a signal D becomes an waveform equivalent to an inverted signal of the error signal A with respect to the upper limit voltage V2.

The error signal A is input to an input of the PWM comparator 112. The triangular wave G, which is an output of the oscillator 110, is input to another input of the PWM comparator 112. The signal D, which is the output signal of the operational amplifier 116, is input to an input of the PWM comparator 114. Similarly to the PWM comparator 112, the triangular wave G is input to another input of the PWM comparator 114.

The voltage step-up/step-down switching regulator 100 further includes NMOS transistors S101 and S102, diodes D101 and D102, a coil L101 and a capacitor C101.

When the voltage step-up/step-down switching regulator 100 performs the step-down operation, the NMOS transistor S102 is off and the NMOS transistor S101 only performs on/off operation. If an input voltage Vin becomes larger than an output voltage Vout, an on-time of the NMOS transistor S101 becomes shorter. If input voltage Vin becomes closer to the output voltage Vout, an on-time of the NMOS transistor S101 becomes longer.

When the voltage step-up/step-down switching regulator 100 performs the step-up operation, the NMOS transistor S101 is on and the NMOS transistor S102 only performs on/off operation. If the input voltage Vin becomes smaller than the output voltage Vout, an on-time of the NMOS transistor S102 becomes longer. If the input voltage Vin becomes closer to the output voltage Vout, an on-time of the NMOS transistor S102 becomes shorter.

The PWM comparator 112 compares the voltage of the error signal A with the voltage of the triangular wave G. If the voltage of the error signal A is larger than the voltage of the triangular wave G, the PWM comparator 112 outputs a signal F with a high level. If the voltage of the error signal A is smaller than the voltage of the triangular wave G, the PWM comparator 112 outputs the signal F with a low level.

The PWM comparator 114 compares the output voltage D of the operational amplifier 116 with the voltage of the triangular wave G. If the voltage of the triangular wave G is larger than the output voltage D, the PWM comparator 114 outputs a signal E with a high level. If the voltage of the triangular wave G is smaller than the output voltage D, the PWM comparator 114 outputs a signal E with a high level.

When the error signal A is within the voltage range of the triangular wave G, the PWM comparator 112 outputs a signal F with a pulse wave and performs the step-down operation by making the NMOS transistor S101 on/off. The output voltage D of the operational amplifier 116 exceeds the upper limit voltage V2 of the triangular wave G during this time period. As a result, the output signal E of the PWM comparator 114 becomes low level and the NMOS transistor S102 becomes off.

When the error signal A exceeds the upper limit voltage V2 of the triangular wave G, the output signal F of the PWM comparator 112 becomes high level and the NMOS transistor S101 becomes on. Meanwhile, when the output voltage D of the operational amplifier 116 is within the voltage range of the triangular wave G, the PWM comparator 114 outputs a signal E with pulse wave and performs the step-up operation by making on/off with the NMOS transistor S102.

Thus, the voltage step-up/step-down switching regulator 100 controls the output voltage to obtain a predetermined constant voltage by exchanging the operational mode between step-up and step-down modes in accordance with the input voltage Vin. However, the conventional voltage step-up/step-down switching regulator 100 needs two PWM comparators, i.e., the PWM comparator 112 to control the step-down switching element of the NMOS transistor S101 and the PWM comparator 114 to control the step-up switching element of the NMOS transistor S102.

Further, in addition to the error amplifier which is commonly used, the operational amplifier 116 is needed to invert the error signal A with respect to the upper limit voltage V2 and to input the inverted error signal to the PWM comparator 114 for the step-up operation. Furthermore, the conventional voltage step-up/step-down switching regulator 100 has a cost penalty because the PWM comparators and the operational amplifier are generally formed of an analog circuit which needs many circuit elements and requires the circuit elements to have high precision.

SUMMARY

This patent specification describes a novel switching regulator which includes a step-up/step-down unit configured to generate an output voltage by stepping up or down an input voltage in accordance with a control signal and a control unit configured to cause the step-up/step-down unit to perform a step-up or step-down operation.

A novel voltage step-up/step-down switching regulator is provided which includes a control unit having an error amplifier to amplify a difference between a proportional voltage generated in proportion to the output voltage and a reference voltage, a first comparator to compare voltages between the amplified voltage and a specific triangular wave and to generate a binary signal based on a comparison result for determining levels of the step-up and step-down operation, a detection circuit to detect a level of the amplified voltage whether the amplified voltage exceeds an upper peak voltage of the specific triangular wave based on the result of the comparison and to generate a detection signal based on a detection result, a first switching circuit to interchange inputs of the proportional voltage and the reference voltage to the error amplifier in accordance with the detection signal, and an second switching circuit to cause the step-up/step-down unit to interchange the step-up and step-down operations with the detection signal.

BRIEF DESCRIPTION OF THE DRAWINGS

A more complete appreciation of the subject matter of the disclosure and many of the attendant advantages and features thereof will be readily obtained as the same becomes better understood by reference to the following detailed description when considered in connection with the accompanying drawings, wherein.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 3, a voltage step-up/step-down switching regulator according to exemplary embodiments are described.

Figure 3:
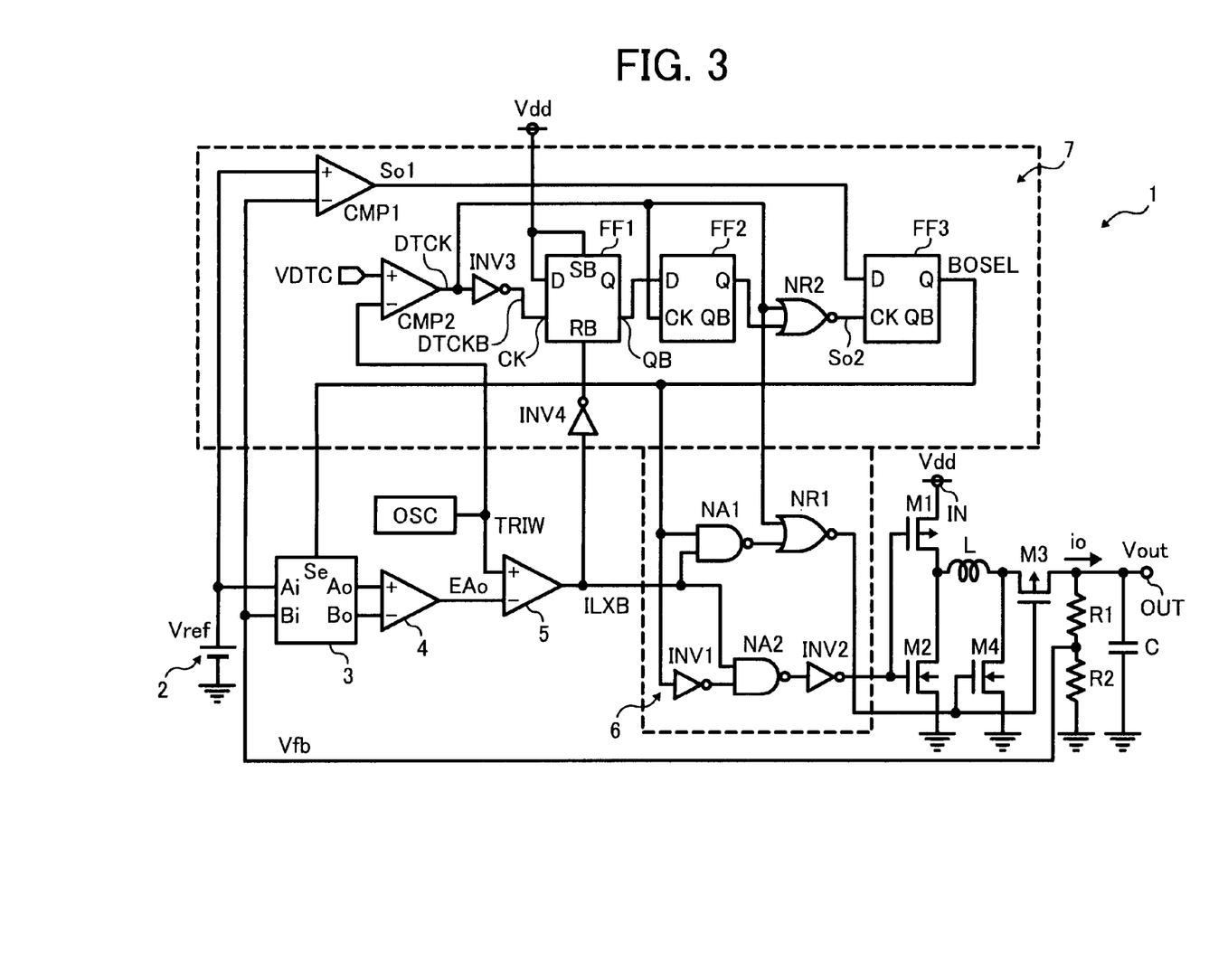
FIG. 3 illustrates a voltage step-up/step-down switching regulator according to an exemplary embodiment of the present disclosure.

FIG. 3 illustrates a voltage step-up/step-down switching regulator 1 according to an exemplary embodiment of the present disclosure. A power supply voltage Vdd is input as an input voltage to an input terminal IN of the voltage step-up/step-down switching regulator 1. The voltage step-up/step-down switching regulator 1 converts the power supply voltage Vdd to a predetermined constant voltage by stepping up or stepping down automatically and outputs the predetermined constant voltage as an output voltage Vout from an output terminal OUT.

The voltage step-up/step-down switching regulator 1 includes first, second, third and fourth switching elements M1, M2, M3 and M4. The first switching element M1 is formed of a PMOS transistor and is configured to perform an output voltage control from the power supply voltage Vdd in a step-down operation. The second switching element M2 is formed of a NMOS transistor and is configured to perform a synchronous rectification in the step-down operation.

The third switching element M3 is formed of a PMOS transistor and is configured to perform the output voltage control from the power supply voltage Vdd in a step-up operation. The fourth switching element M4 is formed of a NMOS transistor and is configured to perform synchronous rectification in the step-up operation.

Further, the voltage step-up/step-down switching regulator 1 includes a reference-voltage generation circuit 2, resistors R1 and R2, an inductor L, a capacitor C, an input switching circuit 3, an error amplifier 4, an oscillator OSC, a PWM comparator 5, an output switching circuit 6 and a detection circuit 7.

The resistors R1 and R2 detect the output voltage of the voltage step-up/step-down switching regulator 1. The first through fourth switching elements M1 through M4, the inductor L and the capacitor C form a step-up/step-down unit. The reference voltage generation circuit 2, the resistors R1 and R2, the input switching circuit 3, the error amplifier 4, the oscillator OSC, the PWM comparator 5, the output switching circuit 6 and the detection circuit 7 form a control unit.

More specifically, the input switching circuit 3 forms a input switching unit and the error amplifier 4 forms an error amplifier unit. The PWM comparator 5 forms a voltage comparator unit. The output switching circuit 6 forms an output switching unit and the detection circuit 7 forms a detection unit. Each element may be integrated into an IC (integrated circuit) except the inductor L and the capacitor C. In another case, the first through fourth switching elements M1, M2, M3 and M4 may not be integrated in addition to the inductor L and the capacitor C.

The reference voltage generation circuit 2 generates and outputs a predetermined reference voltage Vref. The resistors R1 and R2 generate a partial-voltage Vfb by dividing the output voltage Vout, and output the partial-voltage Vfb. The reference voltage Vref and the partial-voltage Vfb are input to the input switching circuit 3. The input switching circuit 3 controls how the reference voltage Vref and the partial voltage Vfb are output. Namely, the reference voltage Vref and the partial voltage Vfb are output from output terminals, respectively, in accordance with a control signal.

Each output terminal of the input switching circuit 3 is connected to a corresponding input terminal of the error amplifier 4. The error amplifier 4 amplifies a voltage difference between the reference voltage Vref and the partial voltage Vfb and generates and outputs an output signal EAo.

The oscillator OSC generates a predetermined triangular wave signal TRIW and outputs the triangular wave signal TRIW. The PWM comparator 5 generates a pulse signal ILXB based on the output signal EAo of the error amplifier 4 and the triangular wave signal TRIW. The PWM comparator 5 outputs the pulse signal ILXB so as to perform PWM control.

The output switching circuit 6 outputs the pulse signal ILXB to the first and second switching elements M1 and M2 or third and forth switching elements M3 and M4 in accordance with the control signal. The detection circuit 7 detects whether the output signal EAo of the error amplifier 4 exceeds an upper peak voltage of the triangular wave signal TRIW. The upper peak voltage of the triangular wave signal TRIW is defined as an upper limit voltage of the triangular wave signal TRIW. Based on the detection result of the detection circuit 7, switching control is performed for the input switching circuit 3 and the output switching circuit 6.

The output switching circuit 6 includes NAND circuits NA1 and NA2, a NOR circuit NR1, inverters INV1 and INV2. The detection circuit 7 includes first and second comparators CMP1 and CMP2, first through third flip-flop circuits FF1 through FF3, a NOR circuit NR2 and inverters INV3 and INV4. The first comparator CMP1 forms a comparator. The first through third flip-flop circuits FF1 through FF3 are formed of D-type flip-flop circuits. The second comparator CMP2 and the inverter INV3 form a clock pulse generation circuit. The first through third flip-flop FF1 through FF3 and the NOR circuit NR2 form a signal detection circuit.

The first and second switching elements M1 and M2 are connected in series between a power supply terminal and ground. The inductor L and the third switching element M3 are connected in series between the output terminal OUT and the connecting node of the first and second switching elements M1 and M2. The forth switching element M4 is connected in series between the connecting node of the inductor L and the third switching element M3 and ground.

Between the output terminal OUT and ground, the capacitor C is connected. In parallel with the capacitor C, the resistors R1 and R2 are connected. The partial-voltage Vfb is output from the connecting node of resistors R1 and R2. The reference voltage Vref is input to an input terminal Ai and the partial voltage Vfb is input to input terminal Bi of the input switching circuit 3. A control signal BOSEL, which is output from the detection circuit 7, is input to a control-signal input terminal Se of the input switching circuit 3.

The output terminal Ao of the input switching circuit 3 is connected to the non-inverted input terminal of the error amplifier 4. The output terminal Bo of the input switching circuit 3 is connected to the inverted-input terminal of the error amplifier 4.

The output signal EAo of the error amplifier 4 is input to the inverted-input terminal of the PWM comparator 5. The triangular wave signal TRIW from the oscillator OSC is input to the non-inverted-input terminal of the PWM comparator 5. The pulse signal ILXB from the PWM comparator 5 is input to the output switching circuit 6 and the detection circuit 7.

Further, the pulse signal ILXB from the PWM comparator 5 is input to one of the input terminals of the NAND circuit NA1 and NA2. The control signal BOSEL is input from the detection circuit 7 to another terminal of the NAND circuit NA1. The control signal BOSEL is input from the detection circuit 7 through the inverter INV1 to another terminal of the NAND circuit NA2.

The output terminal of the NAND circuit NA1 is wired to one of the input terminals of the NOR circuit NR1. An output terminal of the NOR circuit NR1 is wired to gates of the third and forth switching elements M3 and M4. The output terminal of the NAND circuit NA2 is connected to gates of the first and second switching elements M1 and M2 through the inverter INV2.

In the detection circuit 7, the reference voltage Vref is input to a non-inverted-input terminal of the first comparator CMP1. The partial-voltage Vfb is input to an inverted-input terminal of the first comparator CMP1. An output signal So1 of the first comparator CMP1 is input to a D-input terminal of the flip-flop FF3.

The triangular wave signal TRIW is input to an inverted-input terminal of the second comparator CMP2. A predetermined voltage VDTC, which is slightly higher than the lower peak voltage of the triangular wave signal TRIW, is input to a non-inverted-input terminal of the second comparator CMP2. The clock signal DTCK, which is synchronizing with the triangular wave signal TRIW, is output from an output terminal of the second comparator CMP2.

The clock signal DTCK is input to a clock input terminal CK of the flip-flop FF2 and to an input of the NOR circuit NR2. Further, the clock signal DTCK is input to a clock input terminal CK of the flip-flop FF1 through the inverter INV3.

In the flip-flop FF1, the power supply voltage Vdd is input to a data-signal input terminal D and to a set-signal input terminal SB. The pulse signal ILXB from the PWM comparator 5 is input to a reset input terminal RB through the inverter INV4. An output terminal QB of the flip-flop FF1 is wired to a data-signal input terminal D of the flip-flop FF2. An output terminal Q of the flip-flop FF2 is wired to another input terminal of the NOR circuit NR2. An output terminal of the NOR circuit NR2 is wired to a clock input terminal CK of the flip-flop FF3. The control signal BOSEL is output from an output terminal Q of the flip-flop FF3.

Figure 4:
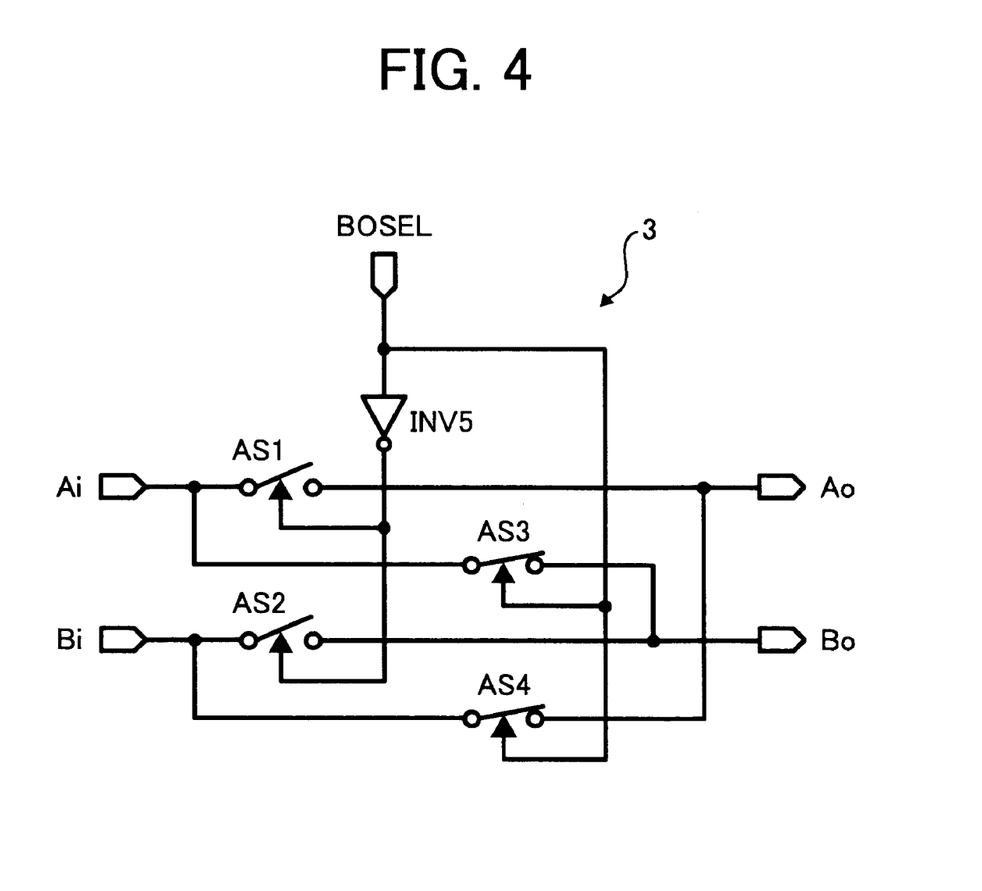
FIG. 4 illustrates an internal circuit configuration of an input switching circuit of FIG. 3.

FIG. 4 illustrates an internal circuit configuration of the input switching circuit 3. The input switching circuit 3 includes four analog switches AS1 through AS4 and an inverter INV5. The first analog switch AS1 is connected between the input terminal Ai and the output terminal Ao. The second analog switch AS2 is connected between the input terminal Bi and the output terminal Bo. The third analog switch AS3 is connected between the input terminal Ai and the output terminal Bo. The fourth analog switch AS4 is connected between the input terminal Bi and the output terminal Ao.

The control signal BOSEL is input to each control electrode of the analog switches AS1 and AS2 through the inverter INV5. Further, the control signal BOSEL is directly input to each control electrode of the analog switches AS3 and AS4.

Table 1 is an operation status table of the analog switches AS1 through AS4 with respect to the control signal BOSEL.

TABLE 1

| BOSEL | AS1 | AS2 | AS3 | AS4 |
|---|---|---|---|---|
| H | OFF | OFF | ON | ON |
| L | ON | ON | OFF | OFF |

As shown in Table 1, when the control signal BOSEL is high level H, the analog switches AS1 and AS2 are off so as to set a shutdown-state and the analog switches AS3 and AS4 are on so as to set a connecting-state. On the other hand, when the control signal BOSEL is low level L, the analog switches AS1 and AS2 are on so as to set the connecting-state and the analog switches AS3 and AS4 are off so as to set the shutdown-state.

As a result, when the control signal BOSEL is high level H, the reference voltage Vref, which is input into the input terminal Ai, is output from the output terminal Bo. Further, the partial voltage Vfb, which is input into the input terminal Bi, is output from the output terminal Ao. The partial voltage Vfb is input to the non-inverted-input terminal of the error amplifier 4 and the reference voltage Vref is input to the inverted-input terminal of the error amplifier 4.

Conversely, when the control signal BOSEL is low level L, the reference voltage Vref, which is input into the input terminal Ai, is output from the output terminal Ao. Further, the partial voltage Vfb, which is input into the input terminal Bi, is output from the output terminal Bo. The partial voltage Vfb is input to the inverted-input terminal of the error amplifier 4 and the reference voltage Vref is input to the non-inverted-input terminal of the error amplifier 4.

Figure 5:
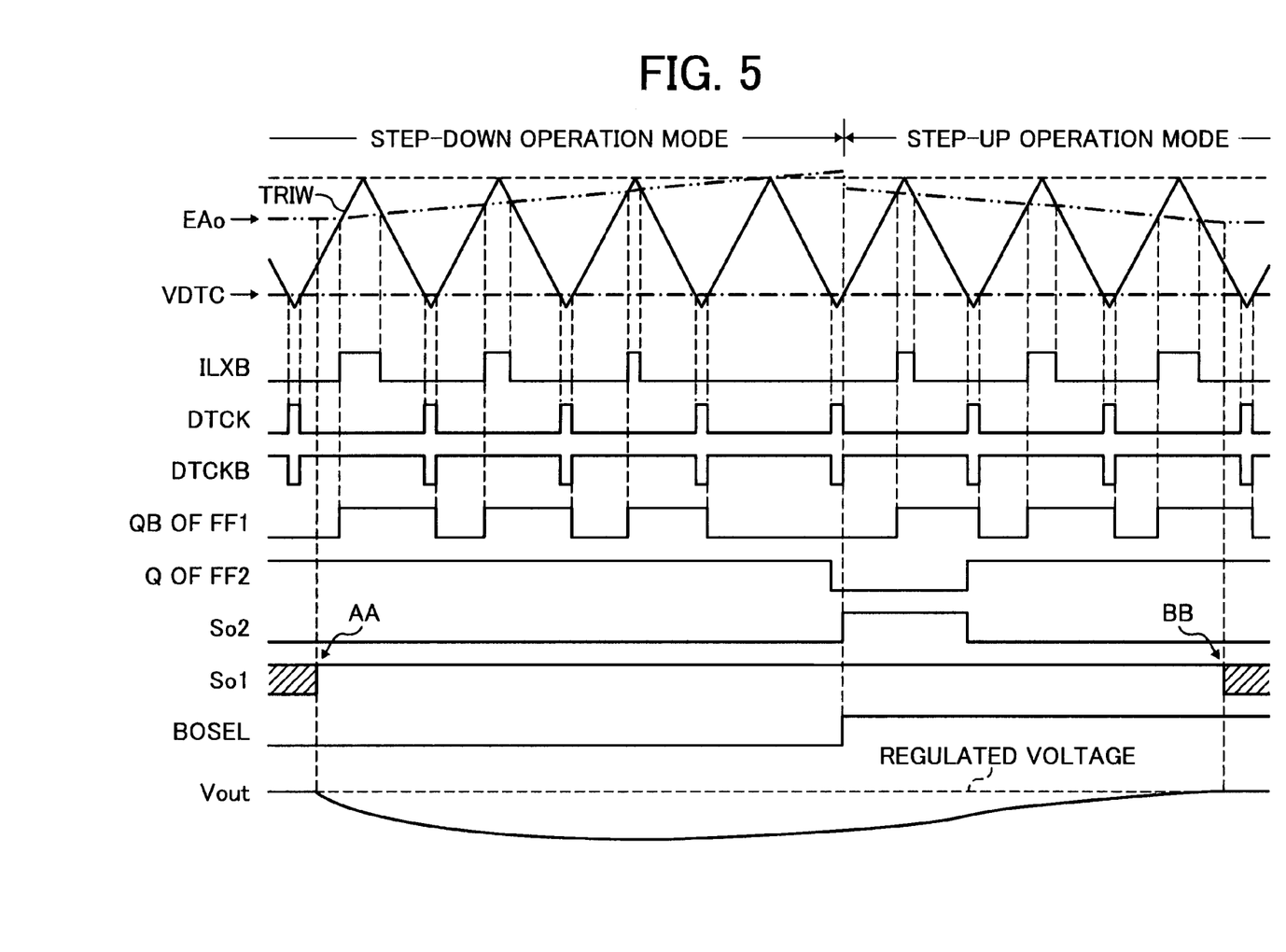
FIG. 5 illustrates a timing chart of waveforms of each part of the circuit of FIG. 3.

FIG. 5 illustrates a timing chart of waveforms of each part of the circuit of FIG. 3. Referring to FIG. 5, an operation of the circuit of FIG. 3 will be described.

The triangular wave signal TRIW and a predetermined voltage VDTC are input to the respective input terminals of the second comparator CMP2. A clock signal DTCK, which is synchronizing with the triangular wave signal TRIW, is output continuously from the output terminal of the second comparator CMP2 independently of the step-up and step-down operation. Further, an inverted clock signal DTCKB is generated by inverting the clock signal DTCK with the inverter INV3.

During a time period from a starting timing to a timing shown by AA in FIG. 5, the voltage step-up/step-down switching regulator 1 performs the step-down operation stably and generates a regulated voltage by stepping down from the power supply voltage Vdd. The regulated voltage is lower than the power supply voltage Vdd. The output signal EAo of the error amplifier 4 is a constant voltage during this time period. In this condition, the reference voltage Vref is almost equal to the partial voltage Vfb. Therefore, an output signal level So1 of the first comparator CMP1 is unstable.

When the output voltage Vout is dropped due to a drop of the power supply voltage Vdd, an increase of an output current io, and so on, the operating condition is shifted to a timing period of a right side from the timing shown by AA in FIG. 5.

In the step-down operation, the control signal BOSEL from the detection circuit 7 is low level. The reference voltage Vref is input to the non-inverted input terminal, and the partial-voltage Vfb is input to the inverted input terminal of the error amplifier 4. As a result, when the partial-voltage Vfb is being dropped, the voltage of output signal EAo of the error amplifier 4 is being increased in accordance with the drop of the partial-voltage Vfb.

A time of low level of the pulse signal ILXB from the PWM comparator 5 becomes longer in accordance with the increasing voltage of the output signal EAo of the error amplifier 4. Meanwhile, the control signal BOSEL is input to the NAND circuit NA2 through the inverter INV1, and a high level is input to the one input of the NAND circuit NA2. Then, the pulse signal ILXB of the PWM comparator 5 is input to each gate of the first and second switching elements M1 and M2 through the NAND circuit NA2 and the inverter INV2.

When the time of low level of the pulse signal ILXB of the PWM comparator 5 becomes longer, the ON time of the first switching element M1, which is the switching element for step-down operation, becomes longer and the output voltage Vout is increased. Further, since the control signal BOSEL from the detection circuit 7 is low level, the voltage of the output terminal of the NAND circuit NA1 is high level independently of the output pulse signal ILXB of the PWM comparator 5.

The high level signal output from the NAND circuit NA1 is inverted by the NOR circuit NR1 and is input to each gate of the third and forth switching elements M3 and M4. The fourth switching element M4 is off so as to set the shutdown-state, and the third switching element M3 is on so as to set the connecting-state.

In the flip-flop FF1, the power supply voltage Vdd is always input to a data-signal input terminal D. And the clock signal DTCKB, which is synchronizing with the triangular wave signal TRIW, is input to the clock input terminal CK of the flip-flop FF1 through the inverter INV3. A voltage of the output terminal QB is set to be low level at timing of each rising edge of the clock signal DTCKB to high level.

Meanwhile, an inverted signal of the pulse signal ILXB of the PWM comparator 5 is input to the reset-input terminal RB of the flip-flop FF1. The output signal at the output terminal QB of the flip-flop FF1 is to be low level at the rising edge of the clock signal DTCKB as shown in FIG. 5. Further, the output signal at the output terminal QB of the flip-flop FF1 is returned to be high level at the rising edge of the pulse signal ILXB of the PWM comparator 5.

In the flip-flop circuit FF2, the output signal from the output terminal QB of the flip-flop FF1 is input to a data-signal input terminal D. And the clock signal DTCK is input to a clock input terminal CK of the flip-flop circuit FF2. Referring to the signal "QB of FF1" shown in FIG. 5, the output signal from the output terminal QB is returned to be the high level by the pulse signal ILXB of the PWM comparator 5 at the rising edge of the clock signal DTCK.

Therefore, a high level is output from the output terminal Q of the flip-flop FF2, as shown by the signal "Q of FF2" in FIG. 5. The output signal So1 of the first comparator CMP1 becomes high level because the partial-voltage Vfb is lower than the reference voltage Vref.

If the output signal EAo of the error amplifier 4 exceeds an upper peak voltage of the triangular wave signal TRIW, the pulse signal ILXB of the PWM comparator 5 is kept to be low level. Therefore, the signal "QB of FF1" cannot return to high level. Namely, the voltage of the output terminal QB of the flip-flop FF1 is kept to be low level when the clock signal DTCK is changed to be high level.

At the rising edge of the clock signal DTCK, the output signal at the output terminal Q of flip-flop FF2 is turned to be low level. Further, the low level signal is input to the clock input terminal CK of the flip-flop FF3 through the NOR circuit NR2. Then, an equal signal to the output signal So1, which is input to the data-input terminal D of the flip-flop FF3, is output from the output terminal of the flip-flop FF3. Namely, the control signal BOSEL is changed from low level to high level so that the operation mode is moved to the step-up operation mode in which the regulated voltage is generated by boosting the power supply voltage Vdd.

When the control signal BOSEL becomes high level, an internal connecting condition of the input switching circuit 3 is changed. The partial-voltage Vfb is input to the non-inverted-input terminal, and the reference voltage Vref is input to the inverted-input terminal of the error amplifier 4. The output signal EAo of the error amplifier 4 starts to decrease. Then, the voltage of the output signal EAo of the error amplifier 4 is returned back within the voltage range, in which the output signal Eao crosses with the triangular wave signal TRIW. As a result, the PWM comparator 5 outputs the pulse signal ILXB.

Since the gate of the NAND circuit NA1 is active when the control signal BOSEL is high level, the pulse signal ILXB is input to each gate of the third and forth switching elements M3 and M4, which are the switching elements for the step-up operation, through the NAND circuit NA1 and the NOR circuit NR1. Then, the voltage step-up/step-down switching regulator 1 starts the step-up operation.

When the control signal BOSEL is high level, the output terminal of the NAND circuit NA2 is high level independently of the pulse signal ILXB. The first switching element M1 is on so as to set the connecting-state, and the second switching element M2 is off so as to set the shutdown-state.

When the output voltage Vout is returned to the predetermined regulated voltage as shown by BB in FIG. 5, the output signal level So1 of the first comparator CMP1 becomes unstable again because the reference voltage Vref is almost equal to the partial-voltage Vfb.

If the output signal EAo of the error amplifier 4 drops down to an lower peak voltage of the triangular wave signal TRIW during the step-up operation, the output pulse signal ILXB of the PWM comparator 5 becomes a high level. The lower peak voltage of the triangular wave signal TRIW is a lower voltage of the triangular wave signal TRIW.

In the step-up operation mode, the first switching element M1, which is the switching element for step-down operation, is on. If the fourth switching element M4, which is a switching element for step-up operation, is kept to be on, the power supply voltage Vdd is shorted to ground through the inductance L. The fourth switching element M4 may be cut off by an off-pulse to avoid an occurrence of this short condition. The NOR circuit NR1 outputs the off-pulse once per cycle of the triangular wave signal TRIW.

In the above description, the process shifting from the step-down operation mode to the step-up operation mode is described. On the other hand, when the output voltage Vout is increased during the step-up operation mode, the time of high level of the pulse signal ILXB of the PWM comparator 5 becomes shorter. The time of high level of the output pulse signal ILXB of the PWM comparator 5 may become zero.

However, it may not be enough to regulate the high level time of the pulse signal ILXB by 0% of the cycle of the triangular wave signal TRIW. Then, the operation mode is switched to the step-down operation. For example, if it is not satisfactory to regulate during one cycle of the triangular wave signal TRIW, the operation mode is switched to the step-down operation. In this case, the control signal BOSEL is fallen from the high level to the low level at the change from the step-up operation mode to the step-down operation mode because the output signal So1 of the first comparator CMP1 is low level.

Thus, the voltage step-up/step-down switching regulator 1 includes the input switching circuit 3, the output switching circuit 6 and the detection circuit 7. When the output voltage Vout drops, a low level pulse width of the pulse signal ILXB of the PWM comparator 5 is increased so as to make the on-time of the first switching element M1 longer. As a result, the output voltage Vout is increased.

Further, if it is not enough to regulate on-state of the first switching element M1 by 100% of the cycle of the triangular wave signal TRIW, the operation mode is automatically switched to the step-up operation mode so as to further increase the output voltage Vout.

Namely, according to the exemplary embodiment, the voltage step-up/step-down switching regulator 1 can perform the step-up and step-down operation using only one error amplifier 4 and PWM comparator 5. Further, the input switching circuit 3, the output switching circuit 6 and the detection circuit 7 can be formed of digital circuit. As a result, when the voltage step-up/step-down switching regulator is formed onto an IC, the IC can be made compact so as to obtain a cost down merit.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. 2005-344177 filed on Nov. 29, 2005 in the Japan Patent Office, the entire contents of which are incorporated by reference herein.

What is claimed is:

1. A switching regulator, comprising:
   an input for an input voltage;
   an output switching circuit;
   an output circuit comprising switching elements and providing an output voltage; and
   a control unit comprising:
      a first switching circuit receiving as inputs a reference voltage and a control voltage, said control voltage being related to the output voltage, and further receiving a control signal, and having a first output and a second output;
      said first switching circuit being configured to respond to a first value of said control signal to output the reference voltage to its first output and the control voltage to its second output, and to respond to a second value of the control signal to output the control voltage to its first output and the reference voltage to its second output;
      an error amplifier receiving as inputs the first and second outputs of the first switching circuit and configured to supply a difference voltage by amplifying a difference between its inputs;
      a pulse width modulation (PWM) comparator receiving as inputs the difference voltage from the output of the error amplifier and a triangular wave and providing a PWM signal resulting from a comparison of the PWM comparator inputs; and
      a detection circuit configured to respond to an increase of said difference voltage within a first selected range to cause said control signal to have said first value and to respond to a decrease of said difference voltage within a second selected range to cause said control signal to have said second value;
      said detection circuit comprising binary electronics generating said control signal and supplying said control signal to said first switching circuit; and
      said output switching circuit comprising logic responding to said PWM signal and to said control signal to control ON-OFF states of said switching elements in said output circuit and thereby control the voltage level of said output voltage.

2. A switching regulator as in claim 1 in which said detection circuit comprises binary flip-flop circuits responsive to inputs including the output of said PWM comparator, the input voltage, the triangular wave and the control voltage to generate said control signal.

3. A switching regulator as in claim 2 in which one of said flip-flops is a last flip-flop receiving at an input thereof a signal resulting from a comparison of said reference voltage and said control voltage and providing said control signal at an output thereof.

4. A switching regulator as in claim 1 in which said detector unit changes the control signal from its second value to its first value when the signal resulting from a comparison of said reference voltage and said control voltage is indicative of a predetermined level of the output voltage.

5. A switching regulator as in claim 4 in which said detection circuit comprises a first flip-flop receiving at an input thereof a signal related to a comparison of said triangular wave and a predetermined voltage and further receiving said PWM signal, and providing a pulse modulated output to a second flip-flop connected between said first and last flip-flops.

6. A switching regulator as in claim 4 in which said triangular wave alternates between a lowest and a highest voltage levels and said predetermined voltage is at a voltage level that exceeds the lowest voltage level of the triangular wave by an amount that is a small fraction of the difference between the highest and lowest voltage levels of the triangular wave.

7. A switching regulator as in claim 1 in which said switching voltage regulator is integrated into an integrated circuit except for at least a portion of said output circuit thereof.

8. A switching regulator as in claim 1 in which said output circuit includes an inductance and a capacitor and said switching voltage regulator is integrated into an integrated circuit except for said inductance and capacitor.

9. A switching regulator as in claim 1 in which said detector unit is configured to change said control signal from said first value to said second value when said difference voltage increases to approximately the highest level voltage of said triangular wave.

10. A switching regulator as in claim 1 in which said control unit includes an oscillator providing said triangular wave to said PWM comparator.

11. A switching regulator controlling an output voltage, said switching regulator comprising:

a detection circuit comprising binary electronics including a series of flip-flops, said detection circuit being configured to generate a control signal having a first value in response to an increase of a difference voltage within a first selected range but a second value in response to a decrease of said difference voltage within a second selected range;

a first switching circuit receiving as inputs a reference voltage and a control voltage, said control voltage being related to the output voltage, and further receiving said control signal, and having a first output and a second output, said first switching circuit being configured to respond to a first value of said control signal to output the reference voltage to its first output and the control voltage to its second output, and to respond to a second value of the control signal to output the control voltage to its first output and the reference voltage to its second output;

said difference voltage being related to a comparison between the outputs of said first switching circuit;

an output circuit comprising switching elements and providing said output voltage; and an output switching circuit comprising logic responsive to said control signal and to a signal resulting from a comparison of said difference voltage and a triangular wave to control ON-OFF states of said switching elements in said output circuit and thereby control the voltage level of said output voltage.

12. A switching regulator as in claim 11 further including:

an error amplifier receiving as inputs the first and second outputs of the first switching circuit and configured to supply said difference voltage by amplifying a difference between its inputs;

a pulse width modulation (PWM) comparator receiving as inputs the difference voltage from the output of the error amplifier and a triangular wave and providing said PWM signal.

\* \* \* \* \*